(12) United States Patent
Chen et al.

(10) Patent No.: US 10,397,062 B2
(45) Date of Patent: Aug. 27, 2019

(54) CROSS LAYER SIGNALING FOR NETWORK RESOURCE SCALING

(71) Applicant: Red Hat, Inc., Raleigh, NC (US)

(72) Inventors: Huamin Chen, Westborough, MA (US); Jay Vyas, Concord, MA (US)

(73) Assignee: RED HAT, INC., Raleigh, NC (US)

( * ) Notice: Subject to any disclaimer, the term of this patent is extended or adjusted under 35 U.S.C. 154(b) by 106 days.

(21) Appl. No.: 15/674,006

(22) Filed: Aug. 10, 2017

(65) Prior Publication Data
US 2019/0052532 A1 Feb. 14, 2019

(51) Int. Cl.
*H04L 12/24* (2006.01)
*H04L 12/911* (2013.01)
*H04L 12/26* (2006.01)

(52) U.S. Cl.
CPC ...... *H04L 41/0896* (2013.01); *H04L 41/0893* (2013.01); *H04L 43/0876* (2013.01); *H04L 43/0882* (2013.01); *H04L 47/781* (2013.01); *H04L 43/16* (2013.01); *H04L 47/822* (2013.01)

(58) Field of Classification Search
CPC ............. H04L 41/0896; H04L 43/0882; H04L 47/781; H04L 43/16; H04L 47/822
See application file for complete search history.

(56) References Cited

U.S. PATENT DOCUMENTS

| | | | |
|---|---|---|---|
| 8,024,441 B2 | 9/2011 | Kommula et al. | |
| 8,285,650 B2 * | 10/2012 | Barker | G06Q 20/102 370/235 |
| 9,300,553 B2 | 3/2016 | Dube et al. | |
| 2010/0254407 A1 * | 10/2010 | Tanaka | H04J 3/1694 370/468 |
| 2016/0328166 A1 * | 11/2016 | Nakamura | G06F 3/0619 |
| 2017/0147249 A1 * | 5/2017 | Hower | G06F 3/0604 |

OTHER PUBLICATIONS

Deep Dive on Elastic Load Balancing; Amazon Web Services; https://www.slideshare.net/AmazonWebServices/deep-dive-on-elastic-load-balancing-64922818; Aug. 11, 2016; retrieved on Jun. 20, 2017 pp. 1-34.
New—AWS Application Load Balancer; Jeff Barr, in Amazon EC2, Amazon Elastic Loan Balancer, AWS Elastic Beanstalk, EC2 Container Service,/Launch, Permalink Aug. 11, 2016, pp. 1-11.

* cited by examiner

*Primary Examiner* — Mohamed A. Wasel
(74) *Attorney, Agent, or Firm* — K&L Gates LLP

(57) ABSTRACT

A service executed on a container is associated with a bandwidth setting, a load balancer that includes a service traffic monitor, and a network switch with a network bandwidth monitor that includes a latency setting, both monitors communicating with a policy engine. The network bandwidth monitor determines first and second bandwidth usage rates of the service over a first time period and a later second time period. The service traffic monitor determines first and second request rates of the service over third and fourth time periods overlapping with the first and second time periods. The policy engine calculates first and second ratios of the first and second bandwidth usage rates to the first and second request rates. The latency setting or the bandwidth setting is increased based on comparing the first and second ratios.

20 Claims, 9 Drawing Sheets

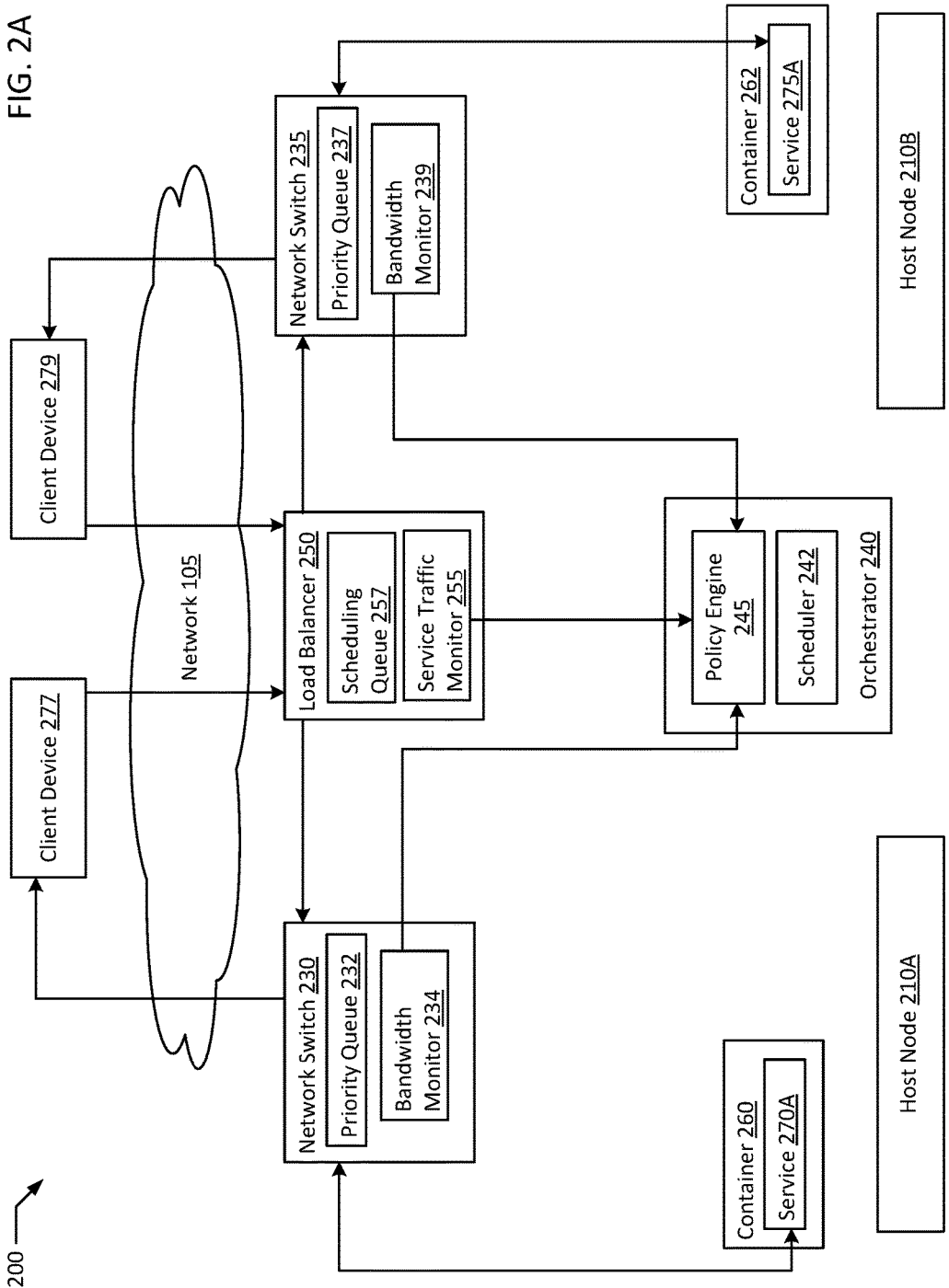

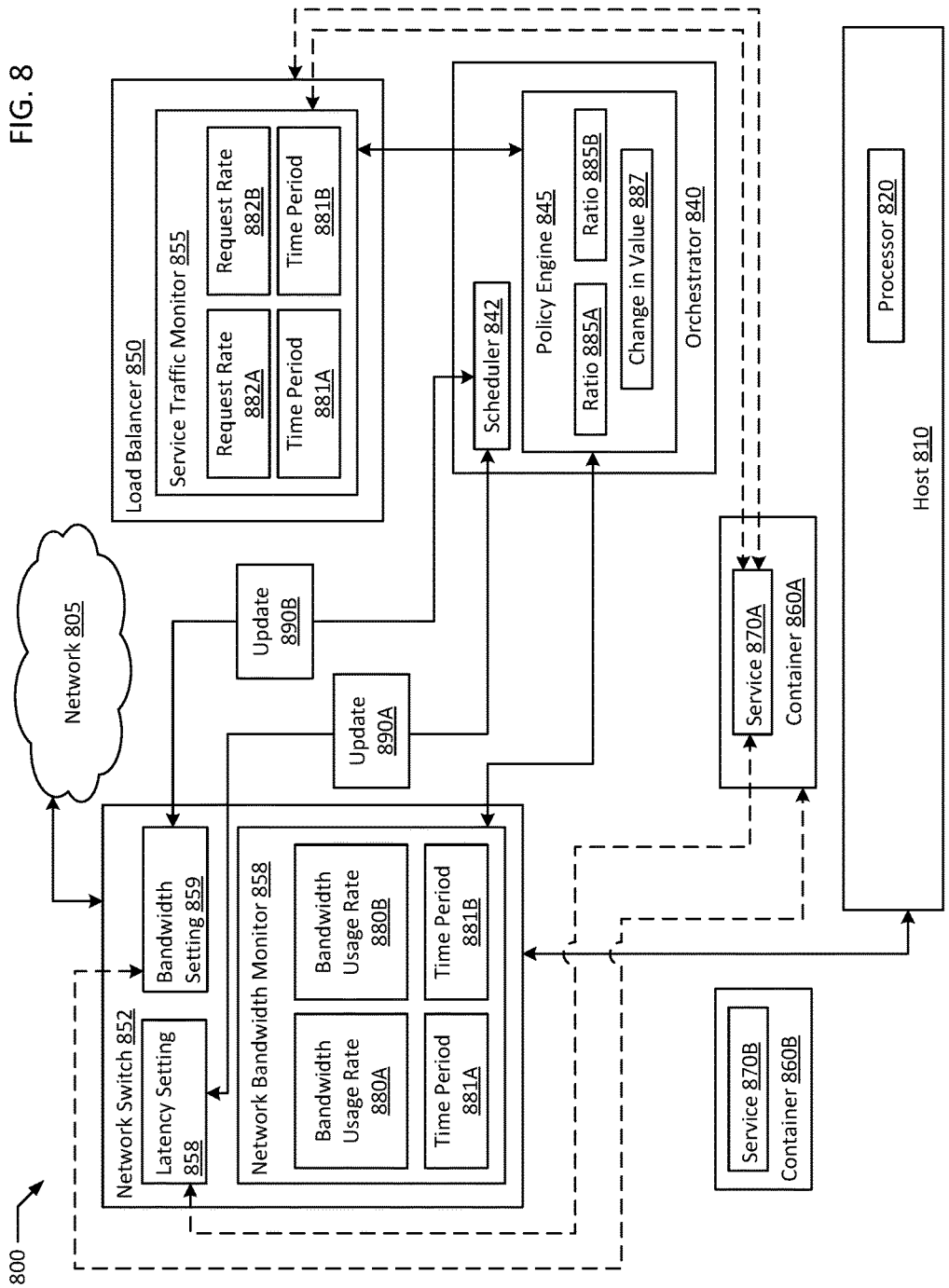

CROSS LAYER SIGNALING FOR NETWORK RESOURCE SCALING

BACKGROUND

The present disclosure generally relates to scaling network resources for services executing on distributed hosting platforms, such as multi-tenant clouds. In computer systems, it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications. Isolated guests may be deployed in a variety of hardware environments. There may be economies of scale in deploying hardware in a large scale. To attempt to maximize the usage of computer hardware through parallel processing using virtualization, it may be advantageous to maximize the density of isolated guests in a given hardware environment, for example, in a multi-tenant cloud. In many cases, containers may be leaner than virtual machines because a container may be operable without a full copy of an independent operating system, and may thus result in higher compute density and more efficient use of physical hardware. Multiple containers may also be clustered together to perform a more complex function than the containers are capable of performing individually. In an example, a container and/or a cluster of containers may be implemented specifically to execute specific tasks and/or certain types of tasks. A scheduler may be implemented to allocate containers and clusters of containers to a host, the host being either a physical host or a virtual host such as a virtual machine. Services executing on isolated guests may be accessed by clients over a network connection.

SUMMARY

The present disclosure provides a new and innovative system, methods and apparatus for cross layer signaling for network resource scaling. In an example, a load balancer including a service traffic monitor is associated with a first service. A network switch includes a network bandwidth monitor and a latency setting associated with the first service. A plurality of containers execute a plurality of instances of the first service including a first container associated with a bandwidth setting executing the first service. A policy engine is in communication with the service traffic monitor and the network bandwidth monitor. One or more processors execute to determine, by the network bandwidth monitor, a first bandwidth usage rate of the first service over a first time period and a second bandwidth usage rate of the first service over a second time period starting after a start of the first time period. The service traffic monitor determines a first request rate of the first service over a third time period overlapping with the first time period and a second request rate of the first service over a fourth time period overlapping with the second time period. The policy engine calculates a first ratio of the first bandwidth usage rate to the first request rate and a second ratio of the second bandwidth usage rate to the second request rate. The policy engine determines that the second ratio is less than or greater than the first ratio. In response to determining that the second ratio is less than the first ratio, the policy engine increases the latency setting. In response to determining that the second ratio is greater than the first ratio, the policy engine increases the bandwidth setting.

Additional features and advantages of the disclosed method and apparatus are described in, and will be apparent from, the following Detailed Description and the Figures.

BRIEF DESCRIPTION OF THE FIGURES

FIG. 2A is a block diagram of cross layer signaling for network resource scaling in an orchestrated containerized system in an example of the present disclosure.

FIG. 8 is a block diagram of an example system of deploying additional containers based on cross layer signaling for network resource scaling in an orchestrated containerized system according to an example of the present disclosure.

DETAILED DESCRIPTION OF EXAMPLE EMBODIMENTS

Figure 1:
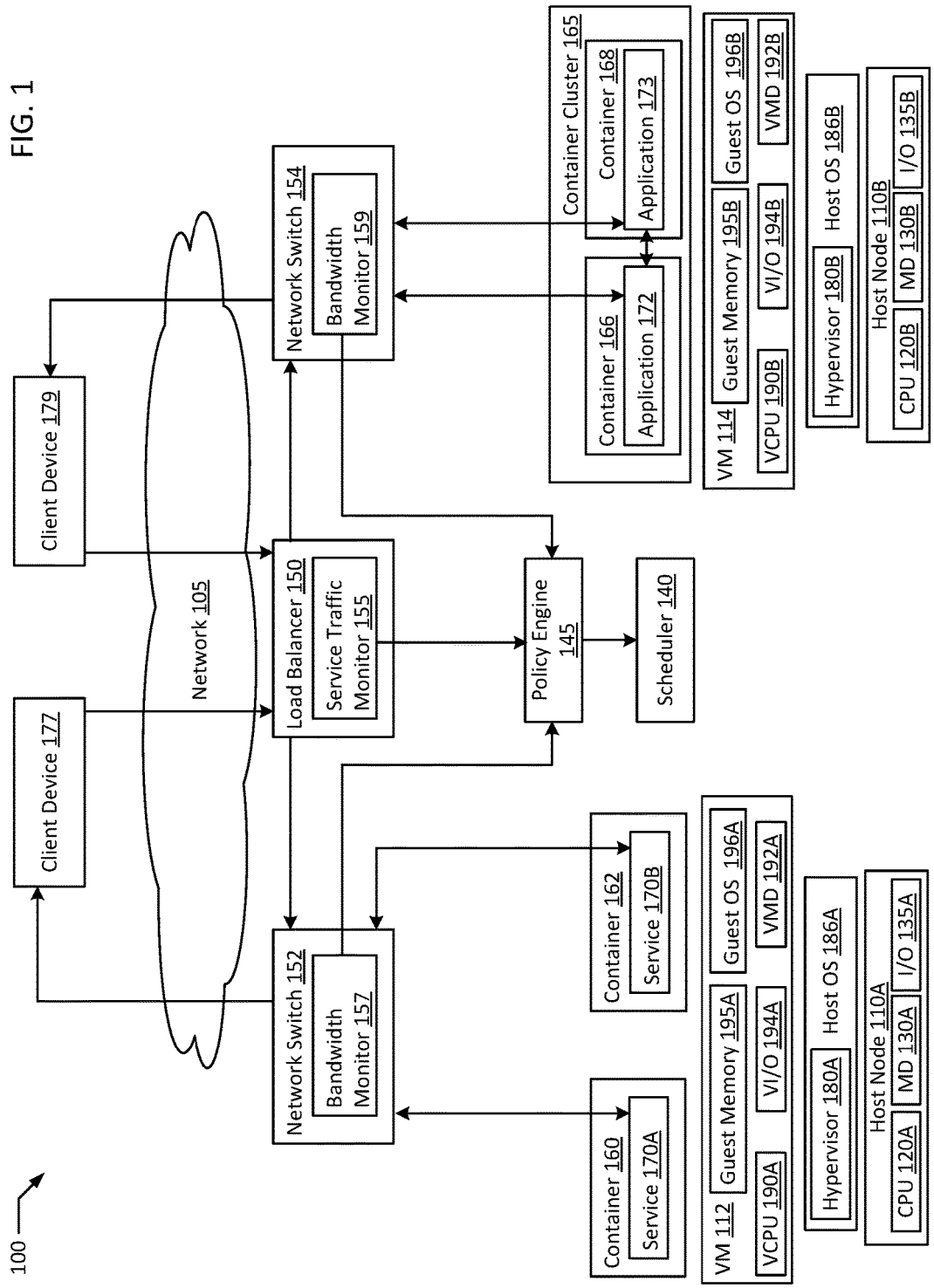
FIG. 1 is a block diagram of a cross layer signaling for network resource scaling system in an example of the present disclosure.

In computer systems utilizing isolated guests, typically, virtual machines and/or containers are used. In an example, a virtual machine ("VM") may be a robust simulation of an actual physical computer system utilizing a hypervisor (e.g., Red Hat® KVM and Red Hat® KVM hypervisor) to allocate physical resources to the virtual machine. In some examples, a container based virtualization system such as Red Hat® OpenShift® or Docker® may be advantageous as container based virtualization systems may be lighter weight than systems using virtual machines with hypervisors. In the case of containers, oftentimes a container will be hosted on a physical host or virtual machine that already has an operating system ("OS") (e.g., Red Hat Enterprise Linux®) executing, and the container may be hosted on the operating system of the physical host or VM. In large scale implementations, container schedulers, such as those included in container orchestrators (e.g., Kubernetes®), generally respond to frequent container startups and cleanups with low latency. Containers may allow wide spread, parallel deployment of computing power for specific tasks (e.g., as microservices). In some examples, multiple containers executing individual components of a broader service may be deployed together, for example in a cluster, to deliver a more complex service. In a typical example, a container may be instantiated to process a specific task and reaped after the task is complete.

Due to economies of scale, containers often tend to be more advantageous in large scale hardware deployments where the relatively fast ramp-up time of containers allows for more flexibility for many different types of applications to share computing time on the same physical hardware, for example, in a private or multi-tenant cloud environment. In some examples, where containers from a homogenous source are deployed, it may be advantageous to deploy containers directly on physical hosts. In a multi-tenant cloud, it may be advantageous to deploy containers and groups of containers within virtual machines as the hosting service may not typically be able to predict dependencies for the containers such as shared operating systems, and therefore, using virtual machines (e.g., with Red Hat Virtualization®) adds flexibility for deploying containers from a variety of sources on the same physical host. In many examples, containers may be constructed as stand units that are restricted from being updated while deployed, and therefore executing containers typically require less permissions on the host to execute than VMs. More restricted access to the hosting environment typically improves security by avoiding potential security gaps that may be exploited, both as between different tenants on the same cloud and between tenants and guests accessing services over the internet. In addition, since containers typically do not require capabilities to execute new code or install new software, potential security risks with those types of functionality may be reduced by eliminating support for such tasks. In an example, hosting containers directly on physical servers may yield further efficiencies, but may restrict the containers executing on the physical servers to containers that are compatible with the physical server's host operating system. In comparison, hosting containers inside VMs may enable the hosting of containers with different architectures on the same physical server. In an example, physical and/or virtual host nodes may each host dozens or hundreds of containers, each of which may independently execute tasks.

In a typical example, a network through which a service, for example, a user facing application hosted on a physical or virtual host (e.g., a VM or a container) may be organized in the Open Systems Interconnection model ("OSI model"). The OSI model comprises seven layers where each layer serves the layer above it and is served by the layer below it. In the OSI model, layer 1 is the physical layer transmitting and receiving raw bit streams over a physical medium; layer 2 is the data link layer providing reliable transmission of data frames between two nodes connected by a physical layer; layer 3 is the network layer structuring and managing a multi-node network, layer 4 is the transport layer providing reliable transmission of data segments between points on a network; layer 5 is the session layer managing communication sessions (e.g., continuous exchanges of information between two nodes); layer 6 is the presentation layer providing translation of data between a network service and an application (e.g., encoding, compression, encryption); and layer 7 is the application layer where network transmissions meet application logic.

In an example, layers 2 through 4 of the OSI model for network traffic between two nodes may be analogized with network of roads that connects two cities. In the example, an application on one node may receive numerous requests from the other node. Extending the roadway analogy to layer 7 of the OSI model, numerous vehicles may travel from one city to the other on the roadway seeking to retrieve goods from the destination city. In the example, congestion on the roadway may be caused by a multitude of reasons, for example, many more motorcycles may flow on the roadway than tractor trailers, so if the goods being retrieved only fit on tractor trailers, the roadway may become congested with many fewer total vehicles than if the goods fit on scooters. However, if each vehicle requires an attendant to determine what cargo should be loaded on the vehicle, and then a loading crew to load the vehicle, a few tractor trailers may block many scooters from being loaded and being sent on their way. Similarly, the attendants may become overloaded by too many vehicles waiting in line. Returning to the OSI model view of networking, layers 2 through 4 provide the bandwidth on which network transmissions are transferred, while layer 7 connects to applications that provide the data handling to determine what needs to be transferred. In a typical networking deployment, these layers 2 through 4 and layer 7 may be managed by different teams of the same entity or different entities altogether, just as the highway system may typically be managed by a government while a warehouse with goods may be managed by a retailer.

In typical network services, requests may be received by a load balancer that distributes the incoming requests to a group of nodes to be handled by the nodes (e.g., copies of services hosted on VMs or containers) individually. In the example, each node may be granted a set amount of bandwidth for uploading and downloading data. To maximize efficiency, network resources such as bandwidth and request priority may be scaled based on signals such as congestion, packet loss, or request volume, either manually or automatically. However, since network resource utilization is often highly volatile, monitoring is needed to predict how resource allocation should be adjusted. Typically, resource utilization is monitored at either layer 4, the Transmission Control Protocol/Internet Protocol ("TCP/IP") level, for bandwidth usage or at layer 7, the application layer, for request count. Unfortunately, neither of these layers provides an ideal level of clarity for how network resources should actually be allocated at a given moment. For example, a news site may serve both text articles and video articles, and traffic to the news site may be driven by breaking news. In the example, both types of articles may be requested and may register as spikes in requests at the layer 7 application level. However, if the latest breaking news article to gather interest is a text article, the responses from the news service may individually be very small, while the responses would be individually very large for a popular video article. In an example, one video article may require as much bandwidth to transfer as one hundred or more text articles. Therefore, in examples where network usage monitoring is performed at the application level (e.g., layer 7), an increase in request count may result in an increase in bandwidth allocation to each container providing the news service. This may well be wasted allocation in a situation where the increase is due purely to an influx of text article demand. In an example, since bandwidth is a limited resource, a wasted increase in allocation to a set of containers reduces the total number of containers that may be hosted on a given host or group of hosts, resulting in unused processing and/or storage capacity, and thus, less efficient use of hardware. Similarly, in examples where network usage monitoring is performed at the transport layer 4 level, a large influx of text article requests, even twenty or thirty times normal may be insufficient to trigger a threshold for any adjustment at all. In the example, many of the text requests may then end up languishing behind a relatively small number of video requests resulting in many text requests sitting in queues on network switches rather than being handled by service nodes.

The present disclosure aims to address the above discussed network scaling issues by implementing cross layer signaling for network resource scaling. In an example, a service traffic monitor is placed on a load balancer for a service while a bandwidth monitor is placed on a network switch utilized by the service to deliver content. A ratio between the rate of requests measured by the service traffic monitor may then be calculated against the rate of bandwidth usage measured by the bandwidth monitor. In an example, by collecting both types of data, a policy engine may predict a scaling action that may provide the greatest efficiency based on the type of traffic being served at a given time. In an example, a high bandwidth to request ratio may indicate heavy video traffic resulting in an upwards adjustment to bandwidth allocation for containers providing a video service. In another example, a low bandwidth to request ratio may indicate heavy text traffic resulting in a higher prioritization of traffic for a text service being set on the network switch or router providing network access to the service. In the example, prioritizing text requests over video requests may allow many text requests to be served quickly, while providing only slight delays to video requests. For example, a requester of a text article may expect the article to load in under a second, while a requester of a video article may expect a few seconds of buffering before the video is served depending on their connection. In an example, by avoiding over upscaling of bandwidth requirements, higher compute capacity may be achieved on each physical host in an environment. In the example, by properly assigning priority to requests at a network switch, prioritization may deliver higher throughput rather than subjective prioritization leading to each application requesting high priority whether or not the application actually currently needs such high priority. Through calculating bandwidth to request ratios, deployments of additional service nodes (e.g., containers) for different services may also be prioritized to increase efficiency for the network resources available to each network switch.

FIG. 1 is a block diagram of a cross layer signaling for network resource scaling system in an example of the present disclosure. The system 100 may include one or more interconnected hosts (e.g., host nodes 110A-B). Host nodes 110A-B may in turn include one or more physical processors (e.g., CPU 120A-B) communicatively coupled to memory devices (e.g., MD 130A-B) and input/output devices (e.g., I/O 135A-B). As used herein, physical processor or processors 120A-B refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory devices 130A-B refers to a volatile or non-volatile memory device, such as RAM, ROM, EEPROM, or any other device capable of storing data. As discussed herein, I/O device 135A refers to devices capable of providing an interface between one or more processor pins and an external device, the operation of which is based on the processor inputting and/or outputting binary data. CPU 120A-B may be interconnected with other CPUs using a variety of techniques, ranging from a point-to-point processor interconnect, to a system area network, such as an Ethernet-based network. Local connections within host nodes 110A-B, including the connections between processors 120A-B and memory devices 130A-B and between processor 120A-B and I/O devices 135A-B may be provided by one or more local buses of suitable architecture, for example, peripheral component interconnect (PCI).

In an example, host nodes 110A-B may run one or more isolated guests, for example, containers 160, 162, 166, 168, and VMs 112, 114. In an example, any of containers 160, 162, 166, and/or 168 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine (e.g., VMs 112, 114). In an example, containers that perform a unified function may be grouped together in a container cluster (e.g., container cluster 165) that may be deployed together (e.g., in a Kubernetes® pod). In an example, containers belonging to the same cluster (e.g., container cluster 165) may be deployed simultaneously by a scheduler 140. In an example, a given service may require the deployment of multiple containers and/or pods in multiple physical locations. In an example, VM 112 and 114 other isolated guests. For example, a VM 112 may host containers (e.g., containers 160 and 162). In addition, containers and/or VMs may further host other guests necessary to execute their configured roles. For example, VMs 112, 114 and/or containers 160, 162, 166, 168 may further host a Java® Virtual Machine if execution of Java® code is necessary.

System 100 may run VM 112 by executing a software layer (e.g., hypervisor 180A) above the hardware and below VM 112. In an example, the hypervisor 180A may be a component of a host operating system 186A executed by the system 100. In another example, the hypervisor 180A may be provided by an application running on the operating system 186A, or may run directly on the host nodes 110A without an operating system beneath it. The hypervisor 180A may virtualize the physical layer, including processors, memory, and I/O devices, and present this virtualization to VM 112 as devices, including virtual central processing units ("VCPU") 190A, virtual memory devices ("VMD") 192A, virtual input/output ("VI/O") devices 194A, and/or guest memories (e.g., guest memory 195A). In an example, a container may execute directly on host OS 186A without an intervening layer of virtualization.

In an example, a VM 112 may be a virtual machine and may execute a guest operating system 196A which may utilize the underlying VCPU 190A, VMD 192A, and VI/O 194A. One or more isolated guests (e.g., containers 160 and 162) may be running on VM 112 under the respective guest operating system 196A. Processor virtualization may be implemented by the hypervisor 180A scheduling time slots on one or more physical processors 120A such that from the guest operating system's perspective those time slots are scheduled on a virtual processor 190A.

VM 112 may run on any type of dependent, independent, compatible, and/or incompatible applications on the underlying hardware and host operating system 186A. In an example, containers 160 and/or 162 running on VM 112 may be dependent on the underlying hardware and/or host operating system 186A. In another example, containers 160 and/or 162 running on VM 112 may be independent of the underlying hardware and/or host operating system 186A. In an example, containers 160 and/or 162 running on VM 112 may be compatible with the underlying hardware and/or host operating system 186A. Additionally, containers 160 and/or 162 running on VM 112 may be incompatible with the underlying hardware and/or OS. The hypervisor 180A may manage memory for the host operating system 186A as well as memory allocated to the VM 112 and guest operating system 196A such as guest memory 195A provided to guest OS 196A. In the example, services 170A-B executing on containers 160 and 162 which may in turn be applications accessed by a client device 177.

In an example, network 105 may be any form of suitable network for allowing communications between computing devices, for example, a public network (e.g., the Internet), a private network (e.g., a local area network (LAN) or wide area network (WAN)), or a combination thereof. In an example, client device 177 may be any form of network accessible device (e.g., phone, tablet, laptop, desktop, server, Internet of Things ("IOT") device, etc.). In an example, client device 177 may have its own processors, memories, I/Os, and/or OS similar to host nodes 110A-B. In an example, client device 177 accessing services 170A and/or 170B may first connect to load balancer 150, for example, through a public address of services 170A-B. For example, a Domain Name Server ("DNS") may resolve an internet address into an Internet Protocol ("IP") address for load balancer 150. In the example, load balancer 150 may allocate a request from client device 177 to be handled by services 170A or 170B. For example, load balancer 150 may forward the request from client device 177 to network switch 152. In an example, network switch 152 may be any device (e.g., switch, router) capable of connecting multiple nodes (e.g., containers 160, 162, VM 112, host node 110A all connected to network switch 152) to a network 105. In an example, service traffic monitor 155 may be a software or hardware component associated with load balancer 150 that is capable of measuring the flow of requests handled by load balancer 150. In an example, bandwidth monitor 157 may be a software or hardware component associated with network switch 152 that is capable of measuring the bandwidth usage (e.g., data transfer rate) through network switch 152. In an example, policy engine 145 may receive request rate data from service traffic monitor 155 and bandwidth usage data from bandwidth monitor 157, and then policy engine 145 may calculate bandwidth:request ratios based on the bandwidth usage data and request rate data. In an example, the bandwidth:request ratios may be used to determine network resource adjustments and/or service deployment adjustments to be made to more efficiently utilize the networking and computing resources of system 100. In an example, rather than tracking bandwidth and request usage together as a bandwidth:request ratio, policy engine 145 may track bandwidth and request usage separately. In such examples, trends in bandwidth usage and request usage may independently result in network resource setting adjustments, for example, by scheduler 140. In an example, either changes in bandwidth usage or changes in request usage may be used to first identify a potential need to update a network resource setting, with the other metric (e.g., bandwidth usage or request usage) used to verify the need to update. In an example, temporally correlated bandwidth usage and request usage data are used together to determine whether any network resource settings require update. In an example, scheduler 140 may implement the network resource adjustments and/or service deployment adjustments. In an example, scheduler 140 may be a VM and/or container scheduler. In an example, scheduler 140 may be part of a more comprehensive deployment solution for virtualized environments, such as an orchestrator (e.g., Kubernetes®) or orchestration platform (e.g., Open Shift®).

In an example, client device 179, network switch 154, bandwidth monitor 159, VM 114, guest memory 195B, guest OS 196B, VCPU 190B, VI/O 194B, VMD 192B, hypervisor 180B, host OS 186B, host node 110B, CPU 120B, memory device 130B, and I/O 135B may be functionally equivalent components to client device 177, network switch 152, bandwidth monitor 157, VM 112, guest memory 195A, guest OS 196A, VCPU 190A, VI/O 194A, VMD 192A, hypervisor 180A, host OS 186A, host node 110A, CPU 120A, memory device 130A, and I/O 135A. In the example, VMs 112 and 114 may be interchangeable hosts for containers hosting services. In an example, applications 172 and 173 hosted on respective containers 166 and 168 on VM 114 may combine to provide a different service from service 170A and service 170B hosted on VM 112. In an example, containers 166 and 168 providing a unified service or microservice may be deployed together as container cluster 165.

FIG. 2A is a block diagram of cross layer signaling for network resource scaling in an orchestrated containerized system in an example of the present disclosure. In an example, illustrated system 200 depicts an orchestrated environment similar to illustrated system 100. In the example, orchestrator 240 includes a scheduler 242 responsible for deploying containers and/or adjusting network resource settings, along with a policy engine 245 receiving bandwidth data from bandwidth monitors 234 and 239, and request rate data from service traffic monitor 255. In the example, policy engine 245 may calculate bandwidth:request ratios and determine what network setting updates if any should be made by scheduler 242. In an example, load balancer 250 may direct requests from client devices 277 and/or 279 to appropriate services (e.g., services 270A, 275A). In an example, load balancer 250 may buffer requests in a scheduling queue 257 while the requests await handling. In an example, services 270A and 275A executing on respective containers 260 and 262 may be instances of the same service. In another example, services 270A and 275A may be different services. In an example load balancer 250 may allocate requests to multiple copies of the same service or different services. In an example services 270A and 275A may be services of the same larger entity that shares load balancer 250. For example, service 270A may be a video streaming service and service 275A may be a news alert feed service. In an example, a different entity may have a different load balancer in the same system as load balancer 250, sharing the same network switches 230, 235 orchestrator 240, and hosts 210A-B, for example, in a multi-tenant cloud environment. In an example, network switch 230 may have a priority queue 232 where network traffic including requests to and content from services including service 270A may be queued and prioritized for handling. In an example, priority queue 237 may perform a similar function for network switch 235.

In an example, scheduler 242 may be any suitable scheduler (e.g., CoreOS® Fleet, Mesosphere® Marathon, Docker Swarm®, Apache® Mesos, Google® Kubernetes®, Docker® Compose, etc.) for instantiating containers including a component of a container orchestrator 240 (e.g., Google® Kubernetes®) or broader containerization platform (e.g., Red Hat® OpenShift®) capable of scheduling containers to execute on hosts (e.g., host nodes 210A-B) managed by the scheduler 242. In an example, orchestrator 240 and scheduler 242 may manage requests for scaling up and scaling down compute capacity for services 270A and 275A hosted on containers 260 and 262.

Figure 2B:
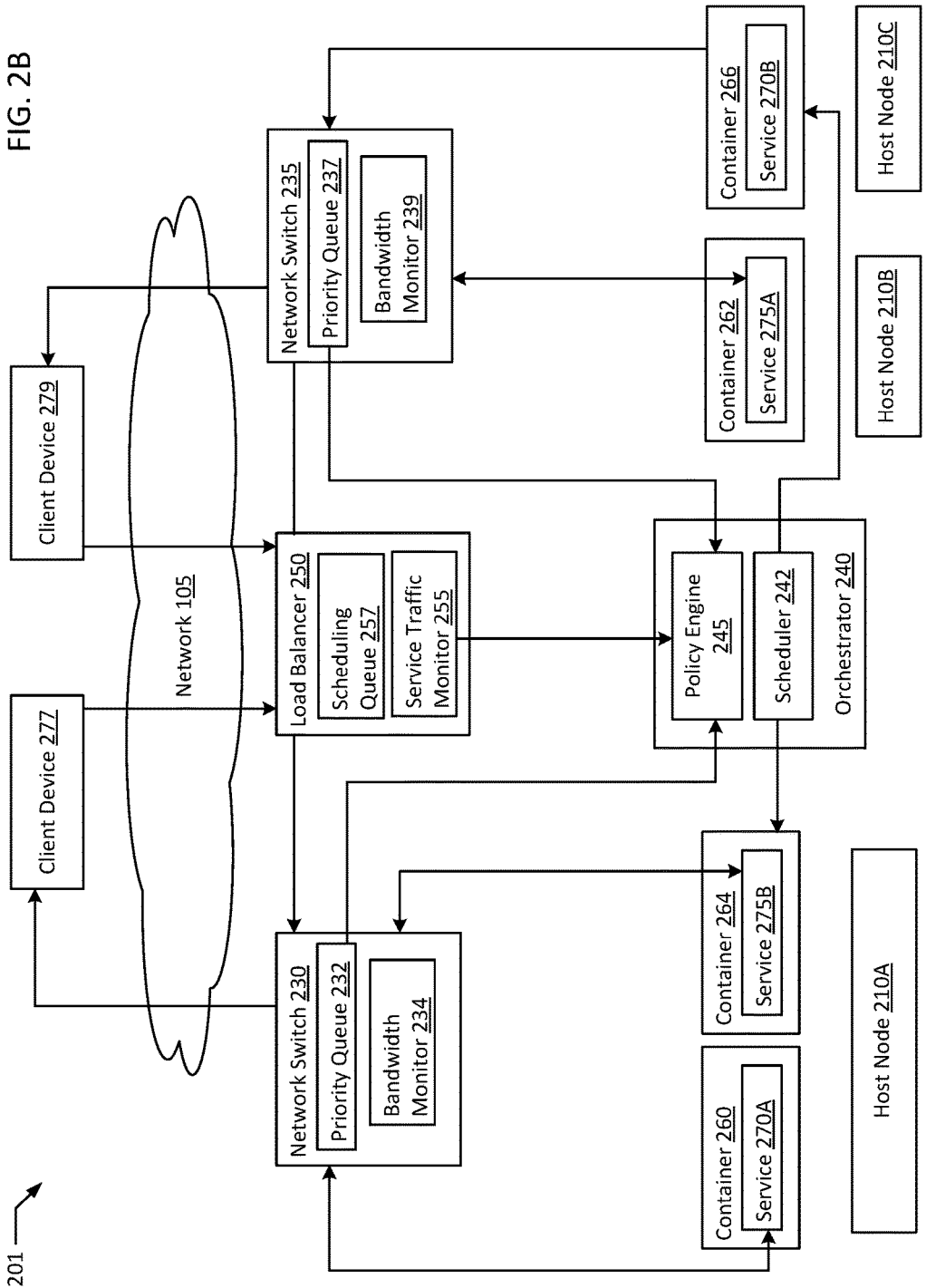
FIG. 2B is a block diagram of deploying additional containers based on cross layer signaling for network resource scaling in an orchestrated containerized system in an example of the present disclosure.

FIG. 2B is a block diagram of deploying additional containers based on cross layer signaling for network resource scaling in an orchestrated containerized system in an example of the present disclosure. In illustrated system 201, additional compute capacity is added to illustrated system 200 by orchestrator 240. In an example, additional capacity for both services 270A and 275A is requested and deployed in the form of container 264 hosting service 275B (e.g., another instance of service 275A) and container 266 hosting service 270B (e.g., another instance of service 270A). For example, orchestrator 240 may deploy additional containers 264 and/or 266 based on scheduling queue 257 reaching a threshold capacity. In the example, load balancer 250 may be waiting on instances of service 270A and/or service 275A to become free to handle additional requests. For example, a busy news day may result in an influx of news alerts that cannot be handled by service 275A as fast as the requests are arriving, requiring the instantiation of container 264 and service 275B to process requests in parallel. In another example, policy engine 245 may request additional instances of services 270A and/or 275A based on changes in the bandwidth:request ratios of services 270A and/or 275A. In an example, additional instances of service 270A may be requested due to a larger than usual video becoming popular, resulting in each copy of service 270A taking longer than normal to handle each request.

In an example, network switch 230 may connect host node 210A along with associated containers 260 and 264 to network 105 while network switch 235 may connect host nodes 210B and 210C along with associated containers 22 and 266 to network 105. In an example, efficiencies may exist for launching multiple instances of the same container on the same host node. For example, multiple copies of container 260 and service 270A launched on host node 210A may be able to share a single copy of core immutable data on host node 210A (e.g., shared libraries) resulting in significantly lower memory usage on host node 210A for subsequent copies of the container. In an example, relaunching a container (e.g., container 260) already existing on host node 210A may also avoid reloading an image file storing the dormant version of container 260 from a network image store. In an example where hundreds of containers are hosted on each physical host node (e.g., host node 210A), such savings may be significant. In another example, hosting diverse containers on host node 210A may be more resilient, due to a lesser percentage of the capacity for any given service (e.g., services 270A, 275B) hosted on host node 210A being impacted due to an outage of host node 210A. In an example, having one network switch (e.g., network switch 230) serving diverse services (e.g., services 270A, 275B) may result in additional efficiencies. For example, video service 270A may not require high priority request handling since the videos served may require buffering anyway, but video service 270A may require high amounts of bandwidth to serve each request. If video service 270A is coupled with text based service 275B, text based service 275B may be allocated a higher priority in priority queue 232 on network switch 230 to experience significantly reduced latency on requests. In the example, service 275B may require little bandwidth thereby allowing a higher total number of containers (e.g., containers 260 and 264) to be served by network switch 240 than if each container connected to network switch 230 were executing a copy of video service 270A. In an example, when scheduler 242 deploys an additional copy of video service 270A (e.g., video service 270B on container 266), scheduler 242 selects host node 210C which shares network switch 235 with host node 210B. In the example, container 266 may be allocated a larger share of bandwidth by network switch 235 than container 262 hosting text service 275A, but service 270B may be allocated a lower priority than service 275A to keep latency down on requests for service 275A.

Figure 3:
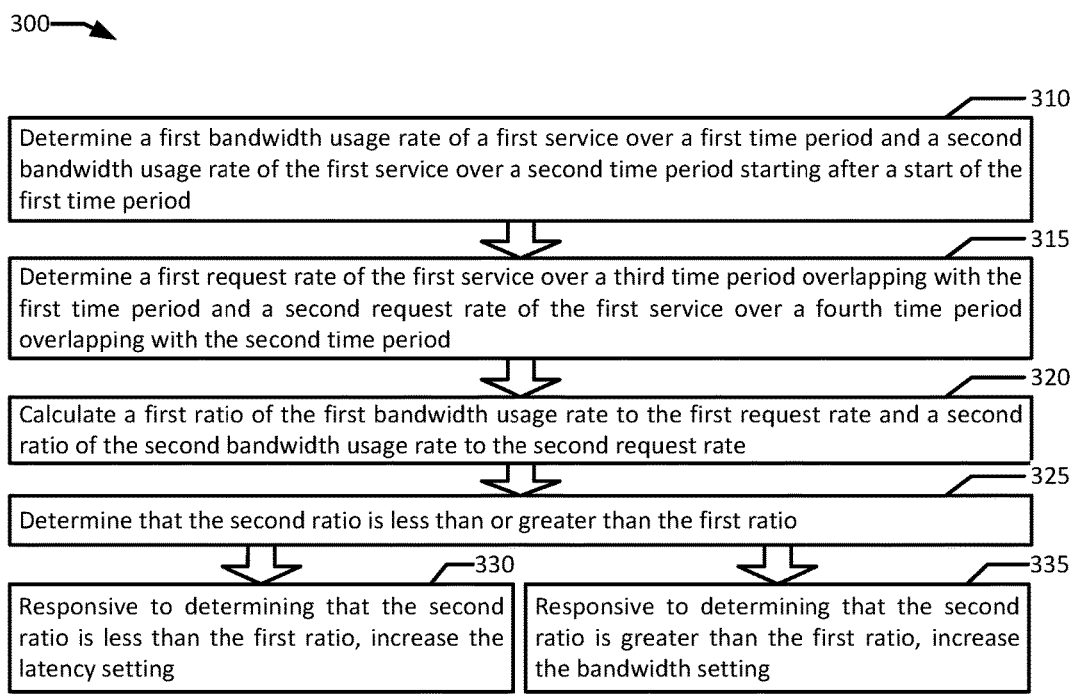
FIG. 3 is a flowchart illustrating an example of cross layer signaling for network resource scaling according to an example of the present disclosure.

FIG. 3 is a flowchart illustrating an example of cross layer signaling for network resource scaling according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. In an example, certain blocks may be periodically and/or iteratively repeated, for example, blocks 310, 315, and 320 in the performance of method 300. The method 300 may be performed by processing logic that may comprise hardware (circuitry, dedicated logic, etc.), software, or a combination of both. In an example, the method 300 is performed by policy engine 145 in conjunction with service traffic monitor 155 and bandwidth monitor 157.

Example method 300 may begin with determining a first bandwidth usage rate of a first service over a first time period and a second bandwidth usage rate of the first service over a second time period starting after a start of the first time period (block 310). In an example, the first service executes on a first container associated with a bandwidth setting. In an example, bandwidth monitor 157 may determine two bandwidth usage rate of service 170A over two time periods, one time period beginning after the other, where service 170A executes on container 160 and container 160 is associated with a bandwidth setting on network switch 152. In another example, bandwidth monitor 159 may determine bandwidth usage rates of a combined service delivered by containers 166 and 168, both parts of container cluster 165, where applications 172 and 173 on containers 166 and 168 combine to deliver an instance of a service.

A first request rate of the first service over a third time period overlapping with the first time period and a second request rate of the first service over a fourth time period overlapping with the second time period are determined (block 315). In an example, the first service is associated with a latency setting. In an example, service traffic monitor 155 determines two request rates of service 170A over two time periods respectively overlapping with the time periods of the bandwidth usage rates measured by bandwidth monitor 157. In an example, service 170A is associated with a latency setting on network switch 152. In an example, the second time period may begin before the first time period ends, resulting in the second time period overlapping with the first for the bandwidth and/or request rates. In an example, the time period of the first bandwidth usage rate measurement and first request rate measurement may completely overlap with each other such that they are measured over the same time period. Similarly, the time period of the second bandwidth usage rate measurement and second request rate measurement may completely overlap with each other such that they are measured over the same time period. In an example, the first time period may include a group of sub-time periods, including sequential first, second, and third sub-time periods, while the second time period may include the second and third sub-time periods with an additional sequential fourth sub-time period. In such an example, two-thirds of the first time period and second time period would overlap, and policy engine 145 may receive bandwidth usage rates and/or request rates after the third sub-time period and again after the fourth sub-time period. In another example, sampling time periods may not overlap at all, for example, bandwidth usage rates and request rates may be sampled for ten seconds out of every thirty seconds.

In an example, request rates and/or bandwidth usage rates may be measured as moving averages, for example, to reduce noise from spikes in usage. In an example, any suitable form of moving average may be implemented (e.g., simple moving average, exponential moving average, weighted moving average, Wilder moving average, Hull moving average, displaced moving average, etc.) In an example, different forms of moving average may be better or worse at filtering out noise from local peaks and valleys in usage. In an example, modifying networking settings may incur overhead so reacting to local peaks and valleys may be detrimental. For example, raising the bandwidth allocated to a given type of container may reduce the deployment capacity of a hosting environment, while reducing the bandwidth for that type of container may result in quality of service impacts if usage shifts to higher bandwidth content.

A first ratio of the first bandwidth usage rate to the first request rate and a second ratio of the second bandwidth usage rate to the second request rate are calculated (block 320). In an example, the policy engine 145 calculates bandwith:request ratios based on the first and second sets of bandwidth usage rates and request rates. The second ratio is determined to be less than or greater than the first ratio (block 325). In an example, policy engine 145 determines that there is a change in the bandwidth:request ratio. In an example, policy engine 145 may notify scheduler 140 to adjust a network setting on network switch 152 in response to a change in the bandwidth:request ratio of service 170A. For example, the latency setting of service 170A and/or the bandwidth setting of container 160 may be adjusted based on a difference between the first bandwidth:request ratio and the second bandwidth:request ratio. In an example, policy engine 145 may directly notify network switch 152 of the requested adjustment. In an example, the change between the first bandwidth:request ratio and the second bandwidth:request ratio must breach a certain minimum threshold before an adjustment is made. For example, a moving average over several time periods must consistently breach the threshold by a certain amount before an adjustment of a latency or bandwidth setting is made either up or down. In an example, a ruleset may be implemented to determine whether, and by how much a given network resource setting is adjusted.

In some examples, the bandwidth usage rate time periods may not coincide with the request rate time periods. For example, bandwidth usage rate may be measured on 5 second intervals while request rates may be measured on 10 second intervals. The policy engine 145 may calculate significant changes to act upon even with imperfect overlap of time intervals due to the averaged natures of both measurements. In an example ruleset, the network bandwidth allocated to container 160 may be increased by 20% if the moving average of the request rate for service 170A over the past five time periods exceeds the moving average of twenty time periods ago by 20% and the moving average of the bandwidth usage of the past three time periods exceeds the moving average of ten time periods ago by 40%. In such an example, the past five request rate time periods may overlap with the past three bandwidth usage time periods. In some examples, the bandwidth monitor 157 and service traffic monitor 155 may calculate the moving averages. In other examples, policy engine 145 may calculate the moving averages.

In response to determining that the second ratio is less than the first ratio, increasing the latency setting (block 330). In an example, policy engine 145 determines that the second bandwidth:request ratio is lower than the first bandwidth:request ratio, and therefore the bandwidth used per request handled for service 170A has decreased. In an example, a decreasing bandwidth:request ratio may be indicative of serving requests that have smaller content payloads, which may have lower expectations of latency, for example, by a user of client device 177. In an example, the latency setting may include a message prioritization setting of requests to and/or content from service 170A on network switch 152. In an example, by increasing priority on requests to or from service 170A, response latency to client device 177's requests may be reduced. In an example, a decreasing bandwidth:request ratio may also allow for a reduction of a bandwidth setting, such as a minimum and/or maximum bandwidth allocation setting for container 160 hosting service 170A. In the example, a decreasing bandwidth:request ratio likely indicates that an amount of content served with each request is decreasing on average, which may indicate that a minimum or guaranteed bandwidth allocation value may safely be reduced, allowing more containers to be deployed, while maintaining enough capacity to satisfy any spikes in usage by individual instances of services 170A-B. In an example, reducing the minimum bandwidth allocation in response to a decrease in bandwidth:request ratio may allow more containers to be deployed to host node 110A connected to network 105 through network switch 152 without impacting content delivery by service 170A.

In an example, in handling requests where a significant or rate limiting component of the request is network latency, message prioritization may greatly reduce the total response time for delivering such requests. However, in examples where network latency is not a rate limiting step, such as an example where an application the time taken to access a video from a hard disk than for streaming dwarfs the network latency savings from prioritizing the video request, improper request prioritization may be significantly detrimental. For example, a given instance of a service may take a millisecond to serve a text article, if a video that required five hundred milliseconds to load were given the same priority as the text article, one video request may block five hundred text article requests from being handled if the text article requests are queued and ready for processing. In an example with one video request and one hundred text article requests queued, processing the video first may add five hundred milliseconds of delay to each of the text article requests, which may be served in one millisecond, effectively a 50,000% increase in processing time. However, prioritizing the text alert requests first may add only one hundred milliseconds to the five hundred millisecond video processing time, so only a 20% increase in processing time for one request as compared to a 50,000% increase in processing time for one hundred requests. In an example, network switch 152 may have a general prioritization setting for all copies of service 170A served by network switch 152, including service 170B. In another example, network switch 152 may have message prioritization setting tuples for container-service pairings (e.g., container 160-service 170A, container 162-service 170B).

In response to determining that the second ratio is greater than the first ratio, increasing the bandwidth setting (block 335). In an example, policy engine determines that the second bandwidth:request ratio is higher than the first bandwidth:request ratio, and therefore the bandwidth used per request handled for service 170A has increased. In an example, the bandwidth setting may be a value or set of values corresponding to the bandwidth usage profile of a host (e.g., host 110A), VM (e.g., VM 112, 114), container (e.g., containers 160, 162, 166, 168), or group of containers (e.g., container cluster 168). In an example, an increasing bandwidth:request ratio may indicate more bandwidth being consumed to deliver the content of an average request. In the example, increasing a bandwidth setting, for example, a minimum or guaranteed bandwidth setting may decrease the number of containers (e.g., containers 160 and 162) that may be served by a given network switch (e.g., network switch 152). For example, because bandwidth capacity allocated as minimum bandwidth may be reserved for a given container 160 and be unavailable for other use even while container 160 does not use the bandwidth. In an example, increasing a minimum bandwidth allocation setting in response to an increase in bandwidth:request ratio may ensure that each container (e.g., containers 160 and 162) delivering services 170A-B may simultaneously deliver higher bandwidth content without having transfer rate being capped by the overall bandwidth capacity of network switch 152. As a result, less total containers may be served by network switch 152. In another example, an increasing bandwidth:request ratio may merit a decrease in a message prioritization setting of requests to services 170A-B. In the example, as requests require larger content payloads, the latency savings resulting from high priority may become inconsequential as compared to the total time a request requires to be served. In such examples, maintaining a high priority for such requests may be counterproductive, causing slower, larger requests to congest network switch 152 and the network switch 152's priority queue rather than allowing smaller, faster requests to be handled first. In an example, reducing the priority of requests to services 170A-B (e.g., to a medium or low priority along a priority gradient) in response to an increasing bandwidth:request ratio may enable higher overall throughput of requests through network switch 152.

In an example, the total bandwidth usage of service 170A may have increased without a significant increase in total requests processed. In an example, an increasing bandwidth:request ratio may be indicative of serving requests that have larger content payloads. For example, a news service may shift from text articles to video streams based on story popularity. In an example, each container (e.g., containers 160, 162, 166, 168) deployed in system 100 may be configured with a bandwidth limit as a bandwidth setting on its respective network switch (e.g., network switches 152, 154). In an example, containers 160, 162, 166, and 168 may also be configured with a bandwidth minimum on network switches 152 and 154. For example, an image file from which containers 160 and 162 are launched may include a requirement that at least three megabits per second of bandwidth must be available to allow for the serve of streaming video, but that up to twenty-five megabits per second may be required to serve ultra high definition video. In an example, an increasing bandwidth:request ratio may also be due to time of day, for example, during business hours, the mobile phone version of a popular video may consume three megabits per second, but when users go home and stream the same video from their television, five megabits per second may be required to display the video at higher resolution. In the example, the minimum and/or maximum bandwidth limits of containers 160 and 162 may be adjusted based on the change in video quality being streamed. In an example, users may expect slightly longer buffering for a higher definition video, and therefore large bandwidth using content items may result in a de-prioritization of traffic to and from containers serving such content. Similarly, when usage shifts back to mobile devices and lower resolution versions of content, bandwidth limits may be decreased to increase the density of containers on host node 110A without significantly affecting latency.

In an example, absolute values of bandwidth usage rate measured by bandwidth monitor 157 and request rate measured by service traffic monitor 155 may additionally factor into determining a proper network resource setting adjustment for responding to a given usage trend. For example, a news site experiencing relatively steady request rate, but a surge in bandwidth:request ratio may be serving a new popular video segment, and therefore increasing the bandwidth limit on containers for the news service may increase throughput and reduce the likelihood that client device 177 needs time to buffer the video. Simultaneously, reducing the priority for handling the news site's requests on network switch 152 may allow for higher throughput of other competing requests, while adding a few milliseconds to the request handling for a video that takes two or three seconds to load may be imperceptible. In the counter example, a surge in request rate without any significant increase in bandwidth usage may be indicative of a viral news article, and a request queue on network switch 152 may be cleared much more quickly, with significant reductions in latency if the news service's requests were prioritized. In the example, additional news service containers may be deployed to handle the response load, and may be deployable to the same existing hardware by reducing the bandwidth allocated to each news service container. In another example, a drop in request rate with steady or higher bandwidth usage rate resulting in a higher bandwidth:request ratio may be more indicative of a shrinking user base, which may better be adjusted for by reducing the number of service containers than adjusting network resource settings.

In an example, load balancer 150 may queue requests to service 170A in a load balancer queue associated with load balancer 150 prior to distributing the requests to copies of service 170A (e.g., services 170A-B) on containers 160 and 162. In an example, scheduler 140 may have instantiated container 162 based on a depth of the load balancer queue to execute a second instance of service 170A (e.g., service 170B). In an example, container 162 may also have been instantiated based on a comparison of a first bandwidth:request ratio to a second bandwidth:request ratio. For example, a sharp drop in bandwidth:request ratio, especially with an increase in request count may indicate a surge in requests for small amounts of content, such as text, and additional copies of service 170A may be required to handle the additional requests. In an example, a long term trend showing a higher or lower network resource setting for a certain container may result in updating the image file from which copies of that container are launched to reflect the optimization. In an example, a current setting for bandwidth and/or message prioritization may be updated into an image file so future instances of the container may avoid adjustments by reflecting a stead state. In an example, trends may be tracked for usage rates based on time of day (e.g., mobile streaming vs. TV streaming) an adjustments to bandwidth settings may be made pre-emptively on network switches 230 and 235.

Figure 4:
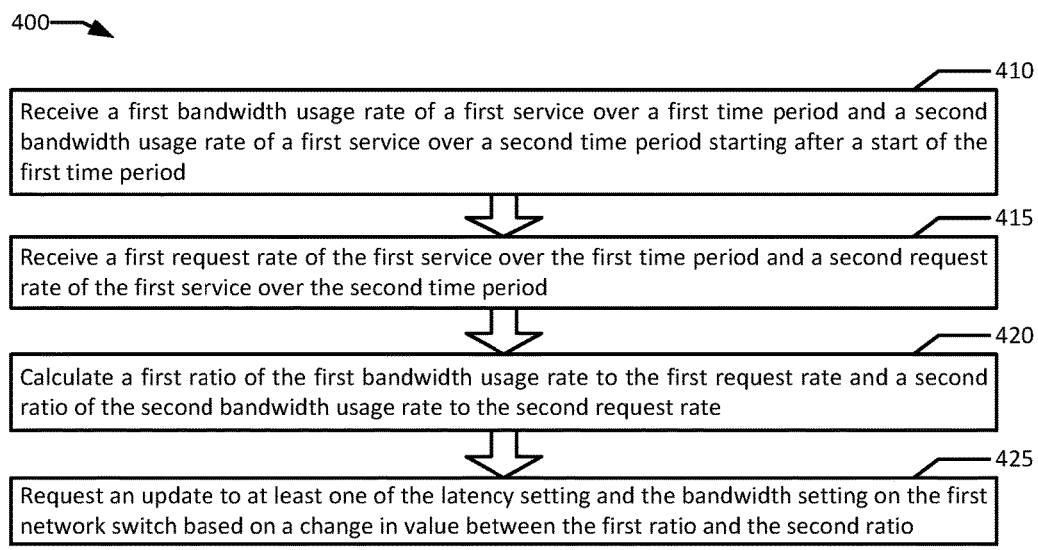
FIG. 4 is a flowchart illustrating an example of cross layer signaling for network resource scaling in an orchestrated containerized system according to an example of the present disclosure.

FIG. 4 is a flowchart illustrating an example of cross layer signaling for network resource scaling in an orchestrated containerized system according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. In an example, certain blocks may be periodically and/or iteratively repeated, for example, blocks 410, 415, and 420 in the performance of method 300. The method 400 may be performed by processing logic that may comprise hardware (circuitry, dedicated logic, etc.), software, or a combination of both. In an example, the method 400 is performed by an orchestrator 240.

Example method 400 may begin with receiving a first bandwidth usage rate of a first service over a first time period and a second bandwidth usage rate of a first service over a second time period starting after a start of the first time period (block 410). In an example, the first service executes on a first container associated with a bandwidth setting. In an example, policy engine 245 of orchestrator 240 receives first and second bandwidth usage rates of service 270A over two time periods one after the other. A first request rate of the first service over the first time period and a second request rate of the first service over the second time period are received (block 415). In an example, the first service is associated with a latency setting. In an example, policy engine 245 of orchestrator 240 receives first and second request rates of service 270A over the same time periods as the bandwidth usage rates.

A first ratio of the first bandwidth usage rate to the first request rate and a second ratio of the second bandwidth usage rate to the second request rate are calculated (block 420). In an example, policy engine 245 of orchestrator 240 calculates first and second bandwidth:request ratios from the first and second request rates and the first and second bandwidth usage rates. In an example, load balancer 250 queues requests of service 270A in load balancer queue 257, prior to distributing the requests of service 270A to container 260, and container 266 is instantiated by the orchestrator 240 based on a depth of load balancer queue 257 and/or a comparison of the first and second bandwidth:request ratios.

An update to the latency setting and/or the bandwidth setting on the first network switch is requested based on a change in value between the first ratio and the second ratio (block 425). In an example, scheduler 242 of orchestrator 240 requests an update to either a latency setting, a bandwidth setting, or both on network switch 230 based on a change in value between the first and second bandwidth:request ratios. In an example, updating the latency setting includes changing a message prioritization setting and updating the bandwidth setting includes changing a bandwidth limit. For example, values corresponding to relative message priorities and/or bandwidth limits may be stored and updated. In an example, a first network utilization pattern of service 270A is calculated with a first plurality of bandwidth usage rates and a first plurality of request rates of service 270A, and a second network utilization pattern of service 275A is calculated with a second plurality of bandwidth usage rates and a second plurality of request rates of service 275A. In an example, orchestrator 240 instantiates container 266 executing a second instance of service 270A (e.g., service 270B) based on the first network utilization pattern.

In an example, network switch 235 is associated with bandwidth monitor 239. In the example, service 275A executes on container 262 on host node 210B which all connect to network 105 through network switch 235. In the example, orchestrator 240 calculates, by policy engine 245, a third bandwidth:request ratio of a third bandwidth usage rate of service 275A to a third request rate of service 275A. The orchestrator 240 instantiates container 264 executing a second instance of service 275A (e.g., service 275B) on host 210A based on a comparison of the second bandwidth:request ratio and the third bandwidth:request ratio. In an example, container 264 is instantiated on host node 210A instead of host node 210B because the network resource usage pattern of service 275A indicates that hosting service 275B on host node 210A may more efficiently utilize computing resources on host node 210A by avoiding making network bandwidth utilization a limiting factor for deploying containers to host node 210A.

Figure 5:
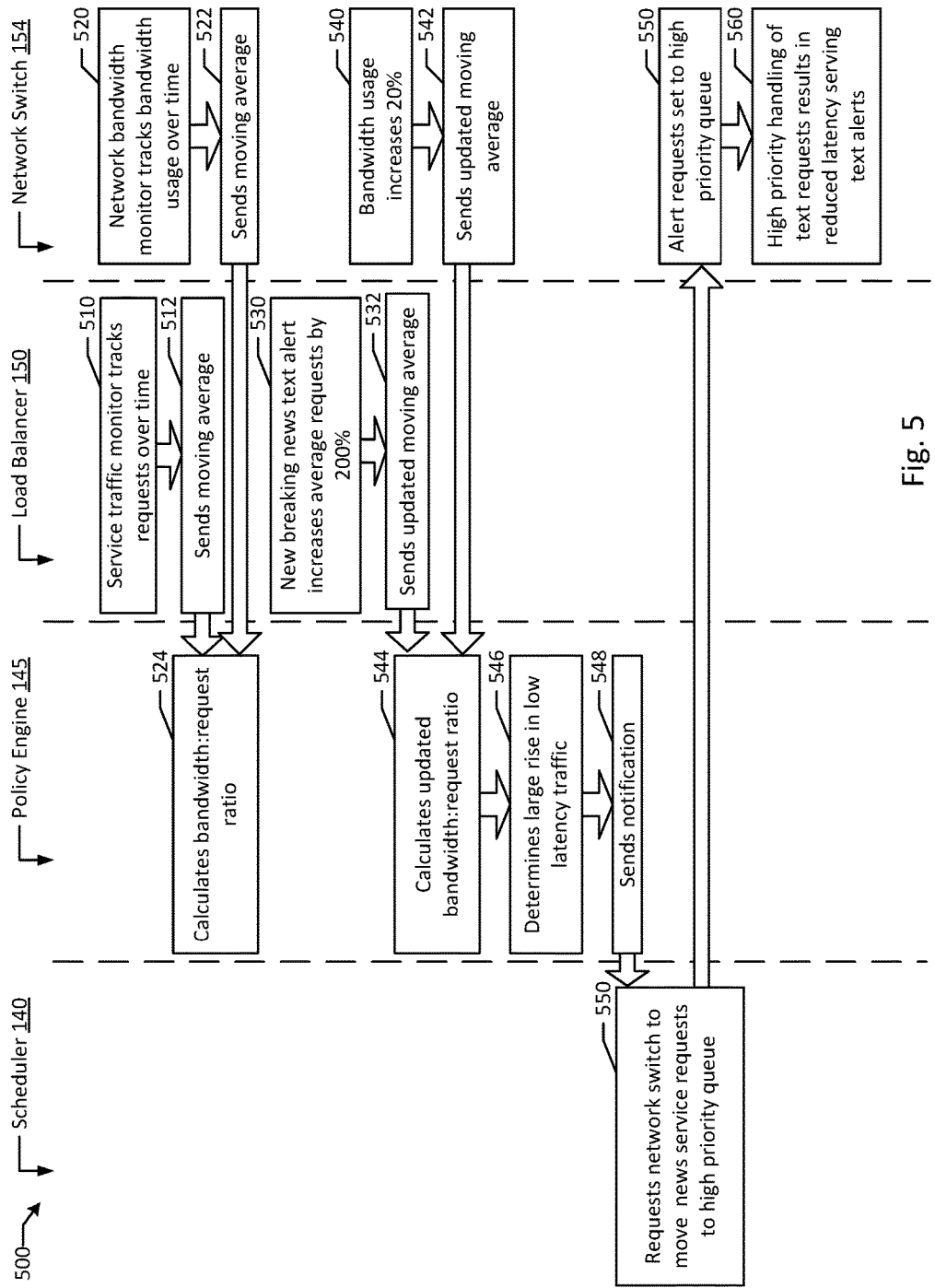
FIG. 5 is flow diagram of an example of cross layer signaling for network resource scaling according to an example of the present disclosure.

FIG. 5 is flow diagram of an example of cross layer signaling for network resource scaling according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, a scheduler 140, a policy engine 145, a load balancer 150, and a network switch 154 scale network resources for a service with cross layer signaling.

In example system 500, load balancer 150 tracks request rates over time via service traffic monitor 155 (block 510). In an example, service traffic monitor 155 of load balancer 150 periodically sends moving averages for request rates to policy engine 145 (block 512). In an example, network switch 152 monitors network bandwidth usage via bandwidth monitor 157 over time (block 520). In the example, bandwidth monitor 157 of network switch 152 periodically sends moving averages for bandwidth usage rates to policy engine 145 (block 522). In an example, policy engine 145 calculates bandwidth:request ratios with the bandwidth usage ratios from bandwidth monitor 157 and the request rates from service traffic monitor 155 (block 524).

In an example, a new breaking news text alert served by application 172 of a news service provided by applications 172 and 173 increases the average request rate by 200% as detected by service traffic monitor 155 of load balancer 150 (block 530). In the example, load balancer 150 sends the updated moving average of the request rate to policy engine 145 (block 532). In an example, during the same period as the 200% increase in request rate, a 20% bandwidth usage rate increase is observed by bandwidth monitor 159 of network switch 154 (block 540). In the example, network switch 154 sends policy engine 145 the updated moving average of the bandwidth usage rate (block 542). In an example, policy engine 145 calculates an updated bandwidth:request ratio of the news service provided by applications 172 and 173 (block 544). In an example, policy engine 145 determines that there has recently been a large rise in low latency traffic for the news service provided by applications 172 and 173 (block 546). In the example, policy engine 145 sends a notification of the increase in low latency traffic to scheduler 140 (block 548). In the example, scheduler 140 requests network switch 154 to move news service alerts to a high priority queue on network switch 154. In an example, network switch 152 begins flagging alert requests to application 172 as high priority while queued on network switch 154 (block 550). In an example, high priority handling for the text requests by network switch 152 to application 172 results in reduced latency for serving the requested text alerts (block 560). In an example, application 173 may serve video alerts for the news service instead of text alerts like application 172. In such an example, updating the prioritization of the news service on network switch 154 may unnecessarily also impact the video content served by application 173. In some examples, prioritization may be implemented for container 166 rather than the news service to avoid prioritizing video content from application 173.

Figure 6:
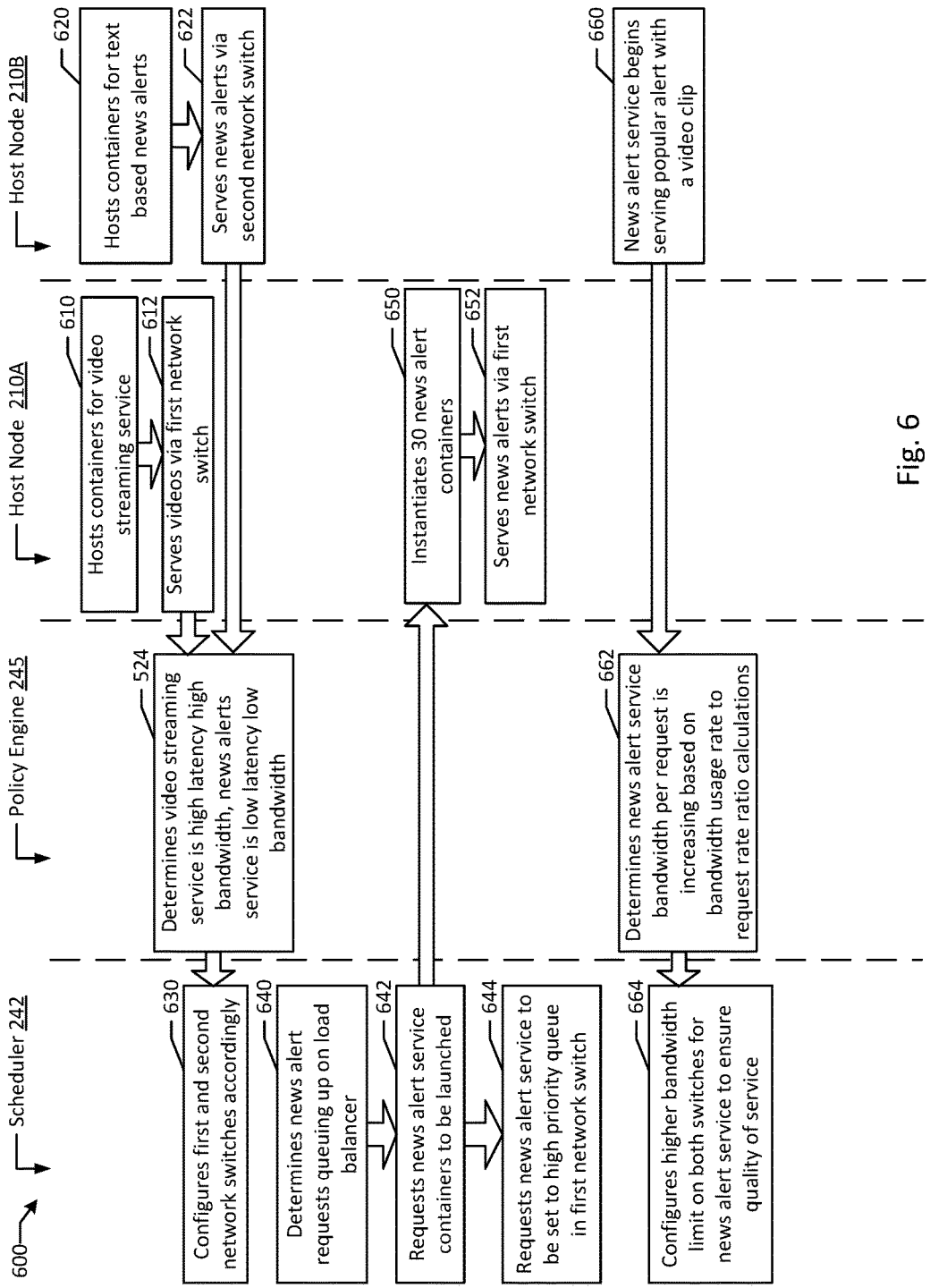
FIG. 6 is flow diagram of an example of cross layer signaling for network resource scaling in an orchestrated containerized system according to an example of the present disclosure.

FIG. 6 is flow diagram of an example of cross layer signaling for network resource scaling in an orchestrated containerized system according to an example of the present disclosure. Although the examples below are described with reference to the flowchart illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, a scheduler 242 and a policy engine 245 coordinate deployment of service containers and network resource scaling on hosts 210A-B.

In example system 600, host node 210A hosts containers (e.g., container 260) for a video streaming service (block 610). In an example, service 270A in container 260 on host node 210A serves videos via network switch 230 (block 612). In an example, host node 210B hosts containers (e.g., container 262) for delivering text based news alerts (block 620). In the example, service 275A in container 262 on host node 210B serves news alerts via network switch 235. In an example, policy engine 245 determines that video streaming service 270A tolerates high latency but requires high bandwidth, while news alerts service 275A requires low latency but requires little bandwidth (block 524). In an example, policy engine 245's determination may be based on interpreting bandwidth:request ratios for services 270A and 275A. In an example, scheduler 242 configures network switches 230 and 235 according to the services (e.g., services 270A and 275A) using each respective network switch (e.g., network switches 230 and 235) (block 630). For example, network switch 230 may be configured to deprioritize traffic for service 270A but to allocate large amounts of bandwidth to container 260. In the example, network switch 235 may be configured to put high priority on requests to service 275A in priority queue 237, but may allocate little bandwidth to container 262.

In an example, scheduler 242 may determine that news alert requests are queuing up on scheduling queue 257 on load balancer 250 (block 640). In the example, scheduler 242 requests news alert service 275A containers to be launched (e.g., container 264) (block 642). In an example, scheduler 242 may then request news alert service 275B requests to be set to high priority in priority queue 232 on network switch 230 (block 644). In an example, setting news alert service 275B to high priority minorly impacts the performance of video service 270A. In an example, host node 210A instantiates 30 news alert containers including container 264 executing news alert service 275B (block 650). In an example, loading instances of the same container 264 executing the same service 275B to the same host node 210A increases the effective hosting capacity of host node 210A by allowing the various instances to share memory for shared libraries and image files. In an example, host node 210A serves news alerts with service 275B and its sister services through network switch 230 (block 652).

In an example, host node 210B begins serving a popular alert with a video clip via news alert service 275A (block 660). In the example, policy engine 245 detects, based on news alert service 275A's bandwidth per request ratio is increasing as calculated based on bandwidth usage rate to request rate (block 662). In an example, scheduler 242 configures a higher bandwidth limit for news request service 275A-B on both network switches 230 and 235 to ensure proper quality of service for video streaming quality on the video alert (block 664).

In an example, cross layer signaling for network resource scaling may be implemented across disparate services sharing a hosting environment (e.g., a multi-tenant cloud). In an example, compute and network capacity in a cloud environment may be scaled with usage trends. For example, during business hours, a cloud storage provider may require significantly higher total bandwidth for file transfers than at night. However, the bandwidth per request may actually be higher at night when file backups are typically run. A shift to higher bandwidth lower message priority network resource settings may enhance performance of the cloud storage service at night for throughput while adding a likely unnoticeable relative delay to initial request handling. In an example a movie streaming service may be hosted on the same physical hosts as the cloud storage service. During the day the movie streaming service may have little traffic, and more compute capacity and containers may be dedicated to the cloud storage service. At night, the cloud storage service may be able to shut down the majority of its containers while a few remaining containers with high throughput handle backups, however, the movie streaming service may scale up with more containers taking the cloud storage service's place. In an example, the movie service may include a ratings and/or preview service which may be deprioritized during the day to document retrieval requests for the cloud storage service, but the ratings or preview service may be prioritized over the file backup requests handled by the cloud storage service at night. By implementing cross layer signaling for network resource scaling, rather than relying on set timing for network resource scaling changes, accurate measurements may reflect real usage. For example, the cloud storage service may have inconsistent usage depending on time of year for the period from 6 PM to 10 PM depending on how busy the cloud storage service's customers are, and cross layer signaling for network resource scaling may prevent requests from being deprioritized until usage profiles actually change rather than having the request priority settings adjusted at a set time (e.g., 7 PM).

Figure 7:
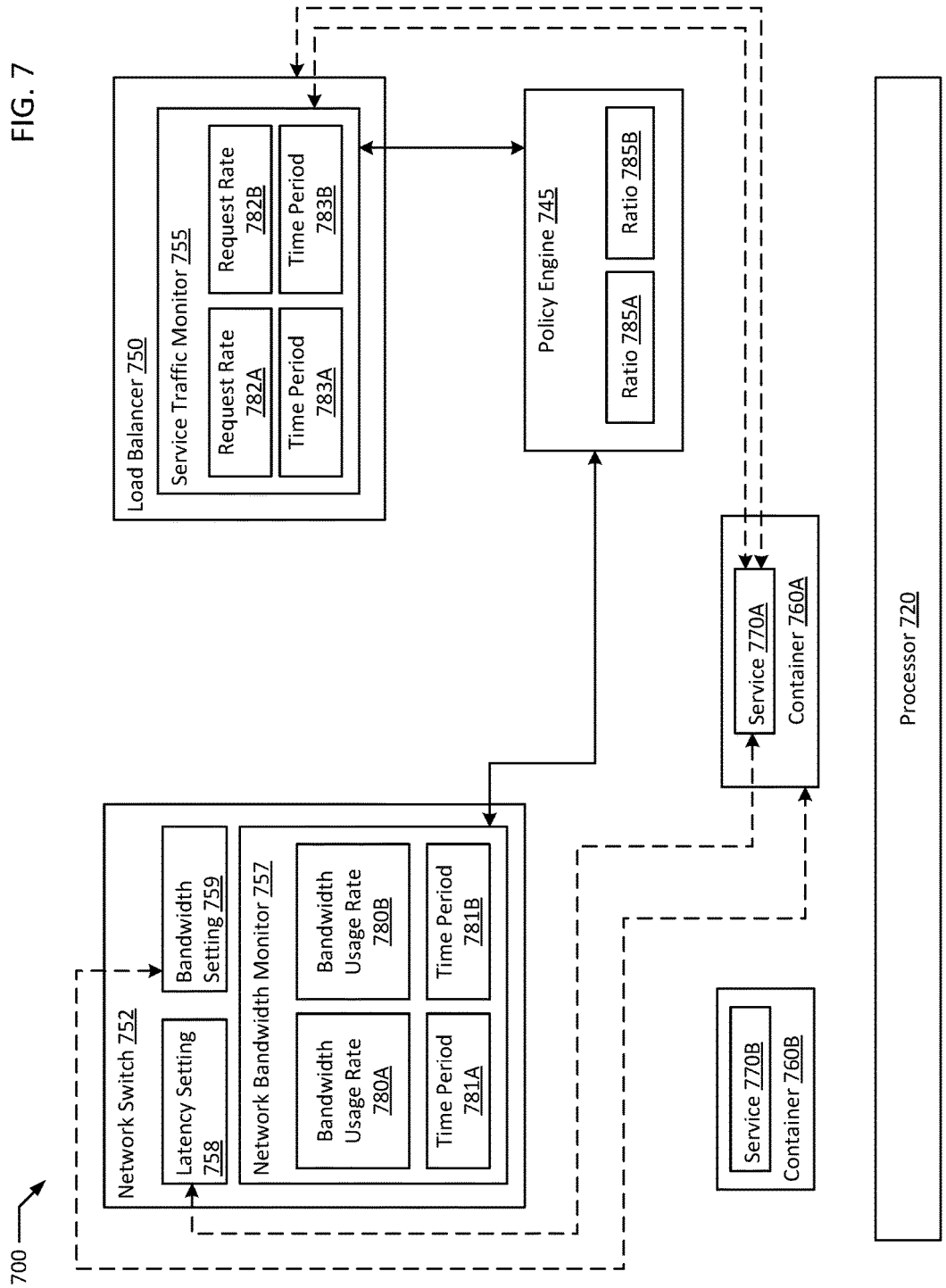
FIG. 7 is a block diagram of an example system of a cross layer signaling for network resource scaling system according to an example of the present disclosure.

FIG. 7 is a block diagram of an example system of a cross layer signaling for network resource scaling system according to an example of the present disclosure. Example system 700 includes load balancer 750 associated with service 770A, load balancer 750 including service traffic monitor 755 associated with service 770. Network switch 752 includes network bandwidth monitor 757, where network switch 752 includes latency setting 758 associated with service 770A. Containers 760A-B execute respective instances of service 770A-B (e.g., the same service), where container 760A executing service 770A is associated with bandwidth setting 759. Policy engine 745 is in communication with service traffic monitor 755 and network bandwidth monitor 757. Processor 720 executes to determine, by network bandwidth monitor 757, bandwidth usage rate 780A of service 770A over time period 781A and bandwidth usage rate 780B of service 770A over time period 781B starting after a start of time period 781A. Service traffic monitor 755 determines request rate 782A of service 770A over time period 783A overlapping with time period 781A and request rate 782B of service 770A over time period 783B overlapping with time period 781B. Policy engine 745 calculates ratio 785A of bandwidth usage rate 780A to request rate 782A and ratio 785B of bandwidth usage rate 780A to request rate 782B. Policy engine 745 determines that ratio 785B is less than or greater than ratio 785A. In response to determining that ratio 785B is less than ratio 785A, increase latency setting 758. In response to determining that ratio 785B is greater than ratio 785A, increase bandwidth setting 759.

FIG. 8 is a block diagram of an example system of deploying additional containers based on cross layer signaling for network resource scaling in an orchestrated containerized system according to an example of the present disclosure. Example system 800 includes load balancer 850 associated with service 870A, including service traffic monitor 885 associated with service 870A. Network switch 852 includes network bandwidth monitor 858, where network switch 852 includes latency setting 858 associated with service 870A. Containers 860A-B execute respective instances of service 870A-B (e.g., the same service), container 860A on host 810 executes service 870A, where host 860A is connected to a network 805 through network switch 852, and container 860A is associated with bandwidth setting 859. Orchestrator 840, including scheduler 842 and policy engine 845, execute processor 820 to receive, by policy engine 845, bandwidth usage rate 880A of service 870A over time period 881A and bandwidth usage rate 880B of service 870A over time period 881B starting after a start of time period 881A. Policy engine 845 receives request rate 882A of service 870A over time period 881A and request rate 882A of service 870A over time period 881A. Policy engine 845 calculates, ratio 885A of bandwidth usage rate 880A to request rate 882A and ratio 885B of bandwidth usage rate 880B to request rate 882B. Scheduler 842 requests update(s) 890A-B to latency setting 858 and/or bandwidth setting 859 based on change in value 887 between ratio 885A and ratio 885B.

Example embodiments of cross layer signaling for network resource scaling in the present disclosure greatly enhance the net compute density in a shared network service deployment environment such as in a cloud environment. Cross layer signaling for network resource scaling may be advantageously implemented at multiple levels with minimal input from other actors and/or stakeholders in a hosting environment. For example, a tenant in a multi-tenant cloud may implement cross layer signaling for network resource scaling to more efficiently request bandwidth from a cloud provider, accurately matching requested bandwidth with a current content distribution profile of the tenant's services. Alternatively, a cloud provider may improve compute density on a cloud platform by deploying guests (e.g., containers and/or VMs) of different tenants with complimentary network usage profiles on hosts sharing the same network switches. In an example, a network switch has a bandwidth cap of 25 gigabits per second. In the example, the network switch may host at most one thousand containers serving high definition video requiring 25 megabits per second of bandwidth. However, the underlying hosts connected to the switch may be able to host five thousand containers of the same processor and memory usage, resulting in a loss of 80% of the hosting capacity of the physical hosts. In an example with cross layer signaling for network resource scaling, up to fifty containers serving text articles at 500 kilobits per second may be substituted for each video serving container, and therefore replacing a few video serving containers with text article serving containers may easily reclaim any lost processor and memory overhead. Alternatively, rather than relying on a container's allocation request specification and allocating the full 25 megabits per second of bandwidth, a policy engine calculating bandwidth:request ratios may determine that on average only 3 megabits per second is used indicating a preference by users to stream a lower definition video. In the example, a few isolated containers at 25 megabits per second may be maintained but the rest of the containers may be scaled back down to 3 megabits per second resulting in large utilization gains. In an example, downscaling of network resource settings may be implemented as an automated feature of a container orchestrator to fit more containers into hardware that may nominally be overloaded. Thus the presently disclosed system may advantageously provide for greater utilization and more efficient use of existing hardware in a typical multi-tenant cloud computing system or the like.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a system comprises: a load balancer associated with a first service, the load balancer including a service traffic monitor associated with the first service; a network switch including a network bandwidth monitor, wherein the network switch includes a latency setting associated with the first service; a plurality of containers executing a plurality of instances of the first service including a first container executing the first service, wherein the first container is associated with a bandwidth setting; a policy engine in communication with the service traffic monitor and the network bandwidth monitor; and one or more processors executing to: determine, by the network bandwidth monitor, a first bandwidth usage rate of the first service over a first time period and a second bandwidth usage rate of the first service over a second time period starting after a start of the first time period; determine, by the service traffic monitor, a first request rate of the first service over a third time period overlapping with the first time period and a second request rate of the first service over a fourth time period overlapping with the second time period; calculate, by the policy engine, a first ratio of the first bandwidth usage rate to the first request rate and a second ratio of the second bandwidth usage rate to the second request rate; determine, by the policy engine, that the second ratio is less than or greater than the first ratio; responsive to determining that the second ratio is less than the first ratio, increase the latency setting; and responsive to determining that the second ratio is greater than the first ratio, increase the bandwidth setting.

In accordance with a 2nd exemplary aspect of the present disclosure, which may be used in combination with any one or more of the preceding aspects (e.g., the 1st aspect), wherein the first request rate, second request rate, first bandwidth usage rate, and second bandwidth usage rate are moving averages. In accordance with a 3rd exemplary aspect of the present disclosure, which may be used in combination with any one or more of the preceding aspects (e.g., the 1st aspect), wherein the first time period completely overlaps with the third time period, and the second time period completely overlaps with the fourth time period. In accordance with a 4th exemplary aspect of the present disclosure, which may be used in combination with any one or more of the preceding aspects (e.g., the 1st aspect), wherein the first time period comprises a plurality of sub-time periods, including at least a first sub-time period, a second sub-time period, and a third sub-time period, and the second time period comprises at least the second sub-time period, the third sub-time period, and a fourth sub-time period. In accordance with a 5th exemplary aspect of the present disclosure, which may be used in combination with any one or more of the preceding aspects (e.g., the 4th aspect), wherein the policy engine receives the first bandwidth usage rate and the first request rate after the third sub-time period, and receives the second bandwidth usage rate and the second request rate after the fourth sub-time period.

In accordance with a 6th exemplary aspect of the present disclosure, which may be used in combination with any one or more of the preceding aspects (e.g., the 1st aspect), wherein at least one of the latency setting and the bandwidth setting is adjusted based on a difference between the first ratio and the second ratio breaching a minimum threshold. In accordance with a 7th exemplary aspect of the present disclosure, which may be used in combination with any one or more of the preceding aspects (e.g., the 1st aspect), wherein the load balancer queues requests of the first service in a load balancer queue, prior to distributing the requests of the first service to the plurality of containers. In accordance with a 8th exemplary aspect of the present disclosure, which may be used in combination with any one or more of the preceding aspects (e.g., the 7th aspect), wherein a second container of the plurality of containers is instantiated based on a depth of the load balancer queue and the second container executes a second instance of the service. In accordance with a 9th exemplary aspect of the present disclosure, which may be used in combination with any one or more of the preceding aspects (e.g., the 7th aspect), wherein a second container of the plurality of containers executing a second instance of the service is instantiated based on at least one of a depth of the load balancer queue and a comparison of the first ratio to the second ratio.

In accordance with a 10th exemplary aspect of the present disclosure, which may be used in combination with any one or more of the preceding aspects (e.g., the 1st aspect), wherein the first container is part of a cluster of containers that combine to execute a first instance of the service. In accordance with a 11th exemplary aspect of the present disclosure, which may be used in combination with any one or more of the preceding aspects (e.g., the 1st aspect), wherein the latency setting includes a message prioritization setting of the first service on the network switch. In accordance with a 12th exemplary aspect of the present disclosure, which may be used in combination with any one or more of the preceding aspects (e.g., the 1st aspect), wherein the bandwidth setting includes a bandwidth limit. In accordance with a 13th exemplary aspect of the present disclosure, which may be used in combination with any one or more of the preceding aspects (e.g., the 1st aspect), wherein at least one of the latency setting and the bandwidth setting is decreased. In accordance with a 14th exemplary aspect of the present disclosure, which may be used in combination with any one or more of the preceding aspects (e.g., the 1st aspect), further comprising modifying a network setting in an image file, wherein the first container is launched from the image file.

Aspects of the subject matter described herein may be useful alone or in combination with one or more other aspects described herein. In a 16th exemplary aspect of the present disclosure, a method comprises: determining a first bandwidth usage rate of a first service over a first time period and a second bandwidth usage rate of the first service over a second time period starting after a start of the first time period, wherein the first service executes on a first container associated with a bandwidth setting; determining a first request rate of the first service over a third time period overlapping with the first time period and a second request rate of the first service over a fourth time period overlapping with the second time period, wherein the first service is associated with a latency setting; calculating a first ratio of the first bandwidth usage rate to the first request rate and a second ratio of the second bandwidth usage rate to the second request rate; determining that the second ratio is less than or greater than the first ratio; responsive to determining that the second ratio is less than the first ratio, increasing the latency setting; and responsive to determining that the second ratio is greater than the first ratio, increasing the bandwidth setting.

In accordance with a 16th exemplary aspect of the present disclosure, which may be used in combination with any one or more of the preceding aspects (e.g., the 15th aspect), wherein the first time period completely overlaps with the third time period, and the second time period completely overlaps with the fourth time period. In accordance with a 17th exemplary aspect of the present disclosure, which may be used in combination with any one or more of the preceding aspects (e.g., the 15th aspect), wherein the second time period overlaps the first time period. In accordance with a 18th exemplary aspect of the present disclosure, which may be used in combination with any one or more of the preceding aspects (e.g., the 15th aspect), wherein at least one of the latency setting and the bandwidth setting is adjusted based on a difference between the first ratio and the second ratio breaching a minimum threshold. In accordance with a 19th exemplary aspect of the present disclosure, which may be used in combination with any one or more of the preceding aspects (e.g., the 15th aspect), wherein the load balancer queues requests of the first service in a load balancer queue and a second container of the plurality of containers executing a second instance of the service is instantiated based on at least one of a depth of the load balancer queue and a comparison of the first ratio to the second ratio. In accordance with a 20th exemplary aspect of the present disclosure, which may be used in combination with any one or more of the preceding aspects (e.g., the 15th aspect), wherein the latency setting includes a message prioritization setting of the first service on the network switch and the bandwidth setting includes a bandwidth limit.

In accordance with a 21st exemplary aspect of the present disclosure, which may be used in combination with any one or more of the preceding aspects (e.g., the 15th aspect), wherein at least one of the latency setting and the bandwidth setting is decreased. In accordance with a 22nd exemplary aspect of the present disclosure, which may be used in combination with any one or more of the preceding aspects (e.g., the 15th aspect), wherein a network setting is modified in an image file with which the first container is launched.

Aspects of the subject matter described herein may be useful alone or in combination with one or more other aspects described herein. In a 23rd exemplary aspect of the present disclosure, system comprises: a means for determining a first bandwidth usage rate of a first service over a first time period and a second bandwidth usage rate of the first service over a second time period starting after a start of the first time period, wherein the first service executes on a first container associated with a bandwidth setting; a means for determining a first request rate of the first service over a third time period overlapping with the first time period and a second request rate of the first service over a fourth time period overlapping with the second time period, wherein the first service is associated with a latency setting; a means for calculating a first ratio of the first bandwidth usage rate to the first request rate and a second ratio of the second bandwidth usage rate to the second request rate; a means for determining that the second ratio is less than or greater than the first ratio; a means for increasing the latency setting responsive to determining that the second ratio is less than the first ratio; and a means for increasing the bandwidth setting responsive to determining that the second ratio is greater than the first ratio.

Aspects of the subject matter described herein may be useful alone or in combination with one or more other aspects described herein. In a 24th exemplary aspect of the present disclosure, computer-readable non-transitory storage medium comprising executable instructions that, when executed by a computer system, cause the computer system to: determine a first bandwidth usage rate of a first service over a first time period and a second bandwidth usage rate of the first service over a second time period starting after a start of the first time period, wherein the first service executes on a first container associated with a bandwidth setting; determine a first request rate of the first service over a third time period overlapping with the first time period and a second request rate of the first service over a fourth time period overlapping with the second time period, wherein the first service is associated with a latency setting; calculate a first ratio of the first bandwidth usage rate to the first request rate and a second ratio of the second bandwidth usage rate to the second request rate; determine that the second ratio is less than or greater than the first ratio; responsive to determining that the second ratio is less than the first ratio, increase the latency setting; and responsive to determining that the second ratio is greater than the first ratio, increase the bandwidth setting.

Aspects of the subject matter described herein may be useful alone or in combination with one or more other aspects described herein. In a 25th exemplary aspect of the present disclosure, a system comprises: a load balancer associated with a first service, including a service traffic monitor associated with the first service; a first network switch including a first network bandwidth monitor, wherein the first network switch includes a latency setting associated with the first service; a first plurality of containers executing a plurality of instances of the first service including a first container on a first host executing the first service, wherein the first host connects to a network through the first network switch and the first container is associated with a bandwidth setting; an orchestrator, including a scheduler and a policy engine, executing on one or more processors to: receive, by the policy engine, a first bandwidth usage rate of the first service over a first time period and a second bandwidth usage rate of the first service over a second time period starting after a start of the first time period; receive, by the policy engine, a first request rate of the first service over the first time period and a second request rate of the first service over the second time period; calculate, by the policy engine, a first ratio of the first bandwidth usage rate to the first request rate and a second ratio of the second bandwidth usage rate to the second request rate; and request, by the scheduler, an update to at least one of the latency setting and the bandwidth setting based on a change in value between the first ratio and the second ratio.

In accordance with a 26th exemplary aspect of the present disclosure, which may be used in combination with any one or more of the preceding aspects (e.g., the 25th aspect), the system further comprises: a second network switch including a second network bandwidth monitor; a second plurality of containers executing a plurality of instances of a second service including a second container on a second host executing the second service, wherein the second host connects to the network through the second network switch; the orchestrator further executing on the one or more processors to: calculate, by the policy engine, a third ratio of a third bandwidth usage rate of the second service to a third request rate of the second service; instantiate, by the orchestrator, a third container of the second plurality of containers on the first host based on a comparison of the second ratio and the third ratio.

In accordance with a 27th exemplary aspect of the present disclosure, which may be used in combination with any one or more of the preceding aspects (e.g., the 25th aspect), wherein a first network utilization pattern of the first service is calculated with a first plurality of bandwidth usage rates and a first plurality of request rates of the first service, and a second network utilization pattern of the second service is calculated with a second plurality of bandwidth usage rates and a second plurality of request rates of the second service. In accordance with a 28th exemplary aspect of the present disclosure, which may be used in combination with any one or more of the preceding aspects (e.g., the 27th aspect), wherein the orchestrator instantiates additional containers of the first plurality of containers based on the first network utilization pattern. In accordance with a 29th exemplary aspect of the present disclosure, which may be used in combination with any one or more of the preceding aspects (e.g., the 25th aspect), wherein the load balancer queues requests of the first service in a load balancer queue, prior to distributing the requests of the first service to the first plurality of containers, and a second container of the first plurality of containers is instantiated by the orchestrator based on at least one of a depth of the load balancer queue and a comparison of the first ratio to the second ratio. In accordance with a 30th exemplary aspect of the present disclosure, which may be used in combination with any one or more of the preceding aspects (e.g., the 25th aspect), wherein updating the latency setting includes changing a message prioritization setting and updating the bandwidth setting includes changing a bandwidth limit.

Aspects of the subject matter described herein may be useful alone or in combination with one or more other aspects described herein. In a 31st exemplary aspect of the present disclosure, a method comprises: receiving a first bandwidth usage rate of a first service over a first time period and a second bandwidth usage rate of a first service over a second time period starting after a start of the first time period, wherein the first service executes on a first container associated with a bandwidth setting; receiving a first request rate of the first service over the first time period and a second request rate of the first service over the second time period, wherein the first service is associated with a latency setting; calculating a first ratio of the first bandwidth usage rate to the first request rate and a second ratio of the second bandwidth usage rate to the second request rate; and requesting an update to at least one of the latency setting and the bandwidth setting on the first network switch based on a change in value between the first ratio and the second ratio.

In accordance with a 32nd exemplary aspect of the present disclosure, which may be used in combination with any one or more of the preceding aspects (e.g., the 31st aspect), the method further comprises: calculating a third ratio of a third bandwidth usage rate of a second service to a third request rate of the second service, wherein a second plurality of containers execute a plurality of instances of the second service including a second container on a second host that connects to the network through a second network switch; instantiating a third container of the second plurality of containers on the first host based on a comparison of the second ratio and the third ratio. In accordance with a 33rd exemplary aspect of the present disclosure, which may be used in combination with any one or more of the preceding aspects (e.g., the 31 st aspect), wherein a first network utilization pattern of the first service is calculated with a first plurality of bandwidth usage rates and a first plurality of request rates of the first service, a second network utilization pattern of the second service is calculated with a second plurality of bandwidth usage rates and a second plurality of request rates of the second service, and a second container is instantiated based on the first network utilization pattern. In accordance with a 34th exemplary aspect of the present disclosure, which may be used in combination with any one or more of the preceding aspects (e.g., the 31st aspect), wherein requests of the first service are queued in a load balancer queue prior to distributing the requests of the first service to the first plurality of containers, and a second container is instantiated by the orchestrator based on at least one of a depth of the load balancer queue and a comparison of the first ratio to the second ratio. In accordance with a 35th exemplary aspect of the present disclosure, which may be used in combination with any one or more of the preceding aspects (e.g., the 31st aspect), wherein updating the latency setting includes changing a message prioritization setting and updating the bandwidth setting includes changing a bandwidth limit.

Aspects of the subject matter described herein may be useful alone or in combination with one or more other aspects described herein. In a 36th exemplary aspect of the present disclosure, a computer-readable non-transitory storage medium comprising executable instructions that, when executed by a computer system, cause the computer system to: receive a first bandwidth usage rate of a first service over a first time period and a second bandwidth usage rate of a first service over a second time period starting after a start of the first time period, wherein the first service executes on a first container associated with a bandwidth setting; receive a first request rate of the first service over the first time period and a second request rate of the first service over the second time period, wherein the first service is associated with a latency setting; calculate a first ratio of the first bandwidth usage rate to the first request rate and a second ratio of the second bandwidth usage rate to the second request rate; and request an update to at least one of the latency setting and the bandwidth setting on the first network switch based on a change in value between the first ratio and the second ratio.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a load balancer associated with a first service, the load balancer including a service traffic monitor associated with the first service;
a network switch including a network bandwidth monitor, wherein the network switch includes a latency setting associated with the first service;
a plurality of containers executing a plurality of instances of the first service including a first container executing the first service, wherein the first container is associated with a bandwidth setting;
a policy engine in communication with the service traffic monitor and the network bandwidth monitor; and
one or more processors executing to:
determine, by the network bandwidth monitor, a first bandwidth usage rate of the first service over a first time period and a second bandwidth usage rate of the first service over a second time period starting after a start of the first time period;
determine, by the service traffic monitor, a first request rate of the first service over a third time period overlapping with the first time period and a second request rate of the first service over a fourth time period overlapping with the second time period;
calculate, by the policy engine, a first ratio of the first bandwidth usage rate to the first request rate and a second ratio of the second bandwidth usage rate to the second request rate;
determine, by the policy engine, that the second ratio is less than or greater than the first ratio;
responsive to determining that the second ratio is less than the first ratio, increase the latency setting; and
responsive to determining that the second ratio is greater than the first ratio, increase the bandwidth setting.

2. The system of claim 1, wherein the first request rate, second request rate, first bandwidth usage rate, and second bandwidth usage rate are moving averages.

3. The system of claim 1, wherein the first time period completely overlaps with the third time period, and the second time period completely overlaps with the fourth time period.

4. The system of claim 1, wherein the first time period comprises a plurality of sub-time periods, including at least a first sub-time period, a second sub-time period, and a third sub-time period, and the second time period comprises at least the second sub-time period, the third sub-time period, and a fourth sub-time period.

5. The system of claim 4, wherein the policy engine receives the first bandwidth usage rate and the first request rate after the third sub-time period, and receives the second bandwidth usage rate and the second request rate after the fourth sub-time period.

6. The system of claim 1, wherein at least one of the latency setting and the bandwidth setting is adjusted based on a difference between the first ratio and the second ratio breaching a minimum threshold.

7. The system of claim 1, wherein the load balancer queues requests of the first service in a load balancer queue, prior to distributing the requests of the first service to the plurality of containers.

8. The system of claim 7, wherein a second container of the plurality of containers is instantiated based on a depth of the load balancer queue and the second container executes a second instance of the first service.

9. The system of claim 7, wherein a second container of the plurality of containers executing a second instance of the first service is instantiated based on at least one of a depth of the load balancer queue and a comparison of the first ratio to the second ratio.

10. The system of claim 1, wherein the first container is part of a cluster of containers that combine to execute a first instance of the first service.

11. The system of claim 1, wherein the latency setting includes a message prioritization setting of the first service on the network switch.

12. The system of claim 1, wherein the bandwidth setting includes a bandwidth limit.

13. The system of claim 1, wherein at least one of the latency setting and the bandwidth setting is decreased.

14. The system of claim 1, further comprising modifying a network setting in an image file, wherein the first container is launched from the image file.

15. A method comprising:
  determining a first bandwidth usage rate of a first service over a first time period and a second bandwidth usage rate of the first service over a second time period starting after a start of the first time period, wherein the first service executes on a first container associated with a bandwidth setting;
  determining a first request rate of the first service over a third time period overlapping with the first time period and a second request rate of the first service over a fourth time period overlapping with the second time period, wherein the first service is associated with a latency setting;
  calculating a first ratio of the first bandwidth usage rate to the first request rate and a second ratio of the second bandwidth usage rate to the second request rate;
  determining that the second ratio is less than or greater than the first ratio;
  responsive to determining that the second ratio is less than the first ratio, increasing the latency setting; and
  responsive to determining that the second ratio is greater than the first ratio, increasing the bandwidth setting.

16. A system comprising:
  a load balancer associated with a first service, including a service traffic monitor associated with the first service;
  a first network switch including a first network bandwidth monitor, wherein the first network switch includes a latency setting associated with the first service;
  a first plurality of containers executing a plurality of instances of the first service including a first container on a first host executing the first service, wherein the first host connects to a network through the first network switch and the first container is associated with a bandwidth setting;
  an orchestrator, including a scheduler and a policy engine, executing on one or more processors to:
  receive, by the policy engine, a first bandwidth usage rate of the first service over a first time period and a second bandwidth usage rate of the first service over a second time period starting after a start of the first time period;
  receive, by the policy engine, a first request rate of the first service over the first time period and a second request rate of the first service over the second time period;
  calculate, by the policy engine, a first ratio of the first bandwidth usage rate to the first request rate and a second ratio of the second bandwidth usage rate to the second request rate; and
  request, by the scheduler, an update to at least one of the latency setting and the bandwidth setting based on a change in value between the first ratio and the second ratio.

17. The system of claim 16, further comprising:
  a second network switch including a second network bandwidth monitor;
  a second plurality of containers executing a plurality of instances of a second service including a second container on a second host executing the second service, wherein the second host connects to the network through the second network switch;
  the orchestrator further executing on the one or more processors to:
  calculate, by the policy engine, a third ratio of a third bandwidth usage rate of the second service to a third request rate of the second service;
  instantiate, by the orchestrator, a third container of the second plurality of containers on the first host based on a comparison of the second ratio and the third ratio.

18. The system of claim 16, wherein a first network utilization pattern of the first service is calculated with a first plurality of bandwidth usage rates and a first plurality of request rates of the first service, a second network utilization pattern of the second service is calculated with a second plurality of bandwidth usage rates and a second plurality of request rates of the second service, and the orchestrator instantiates additional containers of the first plurality of containers based on the first network utilization pattern.

19. The system of claim 16, wherein the load balancer queues requests of the first service in a load balancer queue, prior to distributing the requests of the first service to the first plurality of containers, and a second container of the first plurality of containers is instantiated by the orchestrator based on at least one of a depth of the load balancer queue and a comparison of the first ratio to the second ratio.

20. The system of claim 16, wherein updating the latency setting includes changing a message prioritization setting and updating the bandwidth setting includes changing a bandwidth limit.

* * * * *